March 22, 1955 J. HALLER 2,704,465
SELF-LUBRICATING TOOTHED OR LOBED WHEEL
Filed Dec. 22, 1949 2 Sheets-Sheet 2
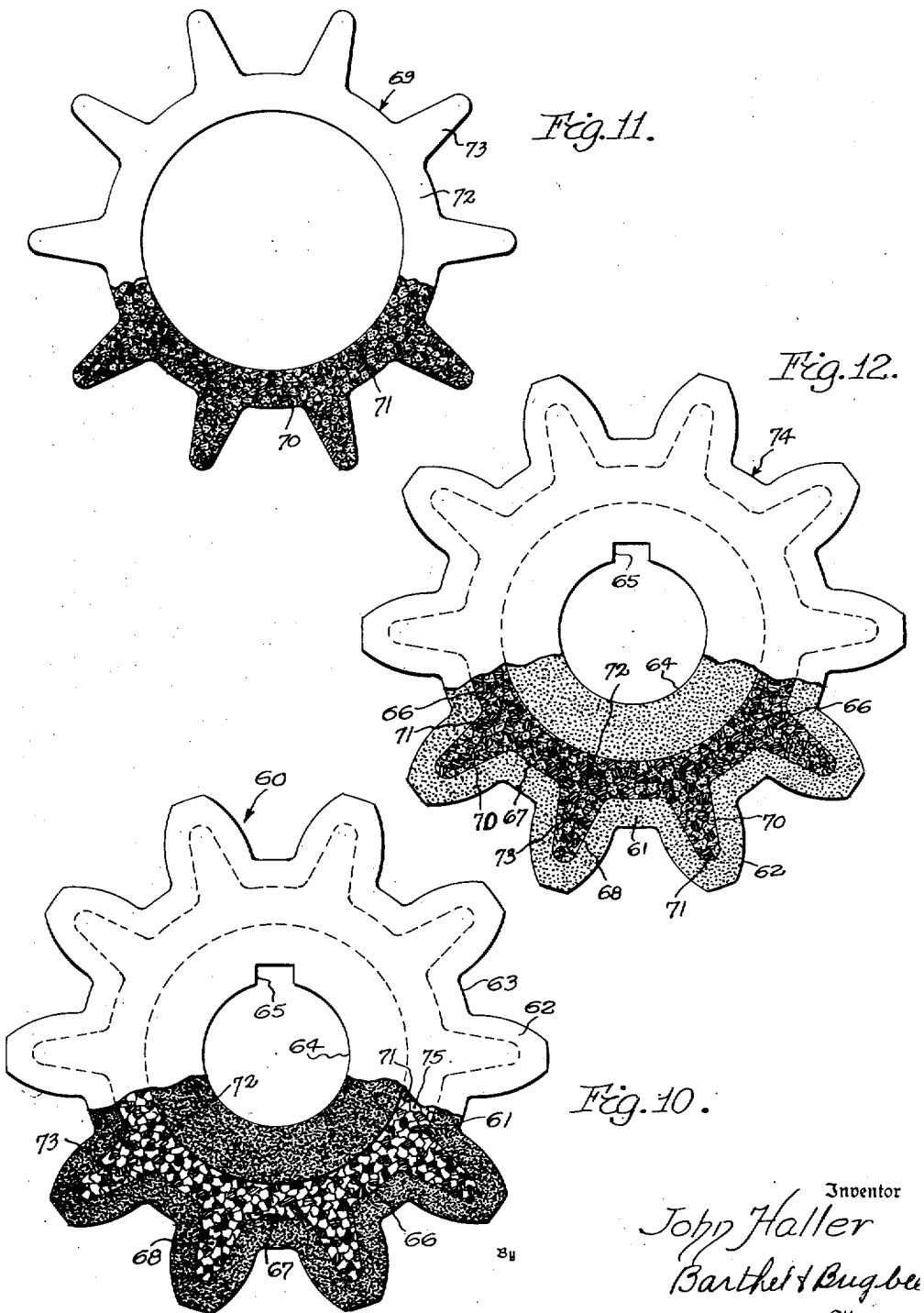
Inventor
John Haller
Barthel & Bugbee
Attorneys

United States Patent Office 2,704,465
Patented Mar. 22, 1955

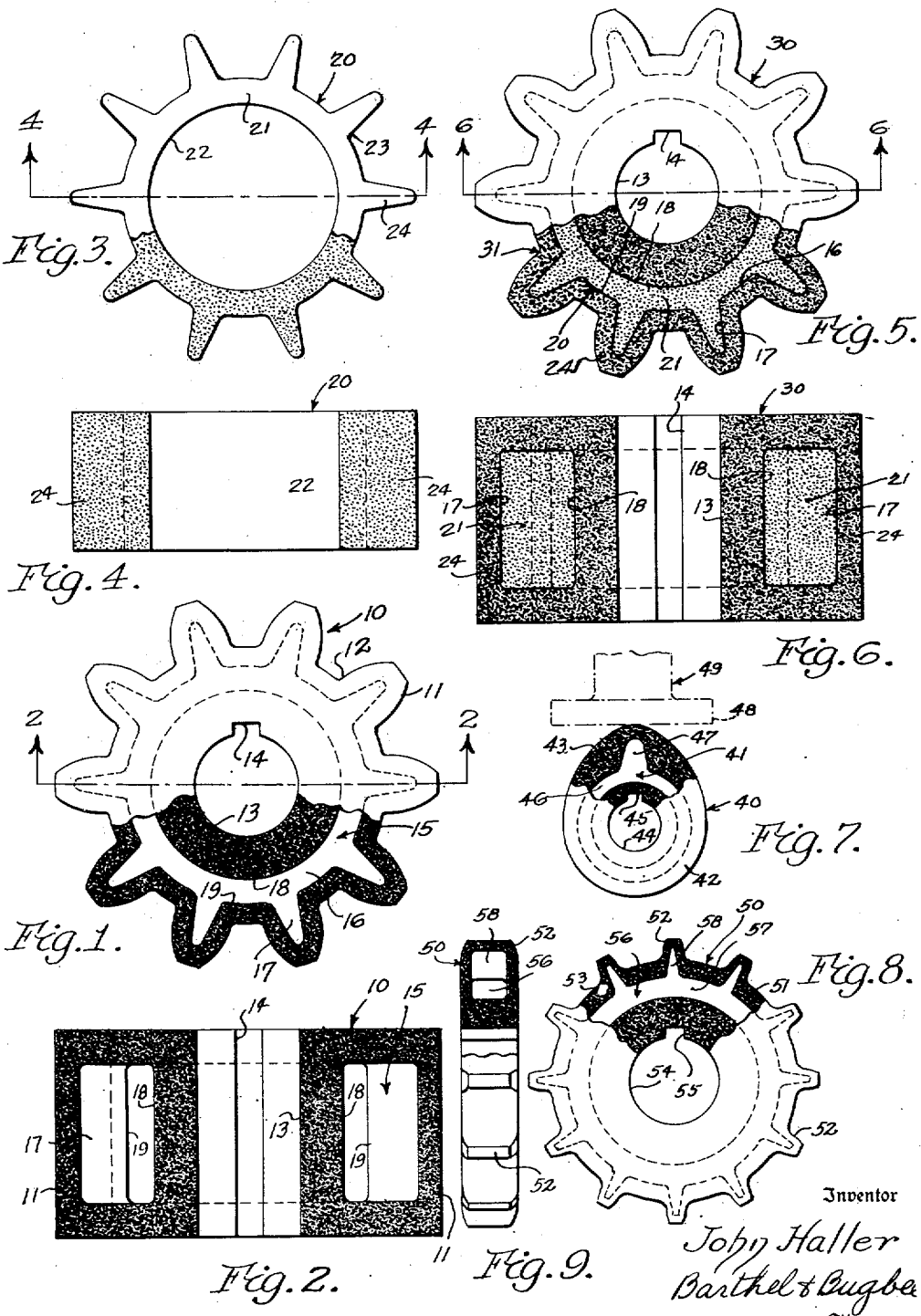

2,704,465

SELF-LUBRICATING TOOTHED OR LOBED WHEEL

John Haller, Northville, Mich., assignor, by mesne assignments, to Allied Products Corporation, Detroit, Mich., a corporation of Michigan Application December 22, 1949, Serial No. 134,521

12 Claims. (Cl. 74—434)

This invention relates to toothed or lobed wheels such as cog wheels, gears, sprocket wheels, ratchet wheels, cams and the like.

In mechanisms employing toothed or lobed wheels, such as cog wheels, gears, cams, sprocket wheels, ratchet wheels and the like, it has hitherto been a difficult problem to supply exactly the correct amount of lubricant to the teeth. If too much lubricant is supplied, it not only is likely to foul the surrounding structure or even to drip to the floor, but also to collect dust and other foreign matter which impedes the proper operation of the mechanism. Moreover, such lubrication requires the attention of an operator to apply the lubricant, and if he is inexperienced, he probably applies either too much or too little lubricant. Furthermore, the application of small amounts of lubricant requires attention at short intervals, thereby necessitating the frequent attention of a workman to apply such lubricant. The most likely occurrence, however, is that the toothed wheel will be neglected and consequently will suffer from lack of lubricant. If too little lubricant is supplied, or if it is not supplied at proper intervals of time, the teeth will run dry, and consequently will wear excessively as well as develop friction which may even halt the mechanism. The present invention provides a gear with constant automatic lubrication in exactly the proper amounts.

One object of the present invention is to provide a toothed or lobed wheel of sintered powdered metal having an internal lubricant reservoir providing a metered supply of lubricant to the teeth or lobes of the wheel so that a film of lubricant is always present on these teeth or lobes without being excessive in quantity so as to attract dust or insufficient so as to result in inadequate lubrication.

Another object is to provide a toothed or lobed wheel of sintered powdered metal of the foregoing character wherein the lubricant reservoir is completely surrounded by the material of the wheel so that access is had to it solely through the pores of the metal, thereby preventing leakage of the lubricant except to locations where it will be effective.

Another object is to provide a toothed or lobed wheel of sintered powdered metal of the foregoing character wherein the lubricant reservoir consists of a permeable honeycomb or cellular space within the gear but of coarser texture or porosity than that of the gear body, so that the cellular lubricant reservoir draws in lubricant by capillary attraction when it is being charged with lubricant initially and thereby avoids the formation of air pockets, but is not of sufficiently fine texture to prevent the free passage of lubricant from it to the pores of the gear body.

In the drawings:

Figure 1 is a side elevation, partly in section, of a self-lubricating gear wheel of sintered powdered metal, according to one form of the invention;

Figure 2 is a horizontal section taken along the line 2—2 in Figure 1;

Figure 3 is a side elevation, partly in section, of an infiltratable core employed in making the gear wheel of Figure 1;

Figure 4 is a horizontal section through the core taken along the line 4—4 in Figure 3;

Figure 5 is a side elevation, partly in section, of the molded gear and infiltratable core;

Figure 6 is a horizontal section taken along the line 6—6 in Figure 5;

Figure 7 is a side elevation, partly in section, of a self-lubricating cam, according to another form of the invention;

Figure 8 is a side elevation, partly in section, of a self-lubricating sprocket wheel, according to still another form of the invention;

Figure 9 is an edge elevation, partly in section, of the sprocket wheel shown in Figure 8;

Figure 10 is a side elevation, partly in section, of a self-lubricating gear wheel of sintered powdered metal, having a cellular or honeycomb lubricant reservoir, according to a further form of the invention;

Figure 11 is a side elevation, partly in section, of a cellular or honeycomb core containing an infiltratable material, employed in making the gear wheel of Figure 10; and Figure 12 is a side elevation, partly in section, of the molded gear wheel containing the core of Figure 11, prior to sintering.

Referring to the drawings in detail, Figures 1 and 2 show a gear wheel, generally designated 10, having teeth 11 projecting from the periphery thereof and having roots 12 between adjacent teeth. The gear 10 is provided with a bore 13 for a shaft and a keyway 14 for receiving a key to establish a driving connection with such a shaft. Formed within the gear 10 between the roots 12 of the periphery and the bore 13 is a lubricant reservoir 15 having an annular portion 16 from which projecting portions 17 extend outward into the interiors of the teeth 11. The annular portion 16 is provided with inner and outer walls 18 and 19 respectively.

In making the gear wheel 10 of Figures 1 and 2, a core 20 is formed of infiltratable material and having the configuration and size desired for the lubricant reservoir 15 of the finished gear 10. For this purpose, the gear core 20 has an annular portion 21 with an inner bore 22 therethrough corresponding to the diameter of the inner wall 18 of the lubricant chamber or reservoir 15 and having roots 23 of a diameter corresponding to the diameter of the outer wall 19 of the reservoir 15. Teeth 24 are formed on the annular portion 21 of the size and configuration desired for the projecting reservoir portions 17.

The material of which the reservoir core 20 is formed depends on the material of which the gear 10 is made, but it must of course be of a lower melting point than the gear metal. If the gear 10 is formed of powdered iron, the core 20 may be formed of a copper-zinc alloy composed of 85% copper and 15% zinc. If, on the other hand, the gear 10 is made of bronze, the core 20 may be formed of lead. A small amount of antimony may be added to the lead, to raise the melting point of the lead and increase its compression strength. Any suitable bronze composition may be used, for example one consisting of 90% copper and 10% tin.

After the core 20 has been prepared, as by casting, it is placed in the mold or die cavity of a molding press wherein the mold or die cavity has a configuration corresponding to the configuration of the gear 10. A layer of powdered metal is first placed in the cavity to a depth corresponding to the side wall thickness desired for the reservoir 15 in the finished gear, increased by a sufficient amount to compensate for the shrinkage due to the compression of the powdered metal in molding. The bore 13 and keyway 14 are ordinarily formed by a plunger which is movable independently of the die cavity and which enters a corresponding bore in the male die member or plunger which has a configuration corresponding in cross-section to the configuration of the gear 10 less a sufficient clearance to enable it to travel smoothly in the die cavity. A machine suitable for performing the molding operations is shown in my co-pending application, Serial No. 780,851 filed October 20, 1947 for Briquetting Machine.

After the core 20 has been laid on the layer of powdered metal already in the die cavity, it is carefully centered or located in its desired position which is to be occupied by the lubricant reservoir 15. After this has been done, the remainder of the die cavity, less the space occupied by the central plunger which is to form the bore 13 and keyway 14, is filled to the desired level with powdered metal, likewise increased to a sufficient amount to compensate for compression. The molding plunger is then moved downward into the die cavity to compress the powdered metal surrounding the core 20.

The plunger is then retracted from the mold cavity and the unsintered molded gear and core assembly, generally designated 30, ejected from the mold cavity. The unsintered assembly 30 is then placed in a sintering oven and raised to the sintering temperature for a sufficient amount of time to properly sinter the powdered metal portion 31 of the assembly 30. For a powdered metal portion 31 of powdered iron, for example, using an infiltratable core 20 of copper-zinc alloy described above, a sintering temperature of 2020° F. for approximately one-half hour is found to be satisfactory for small gears. During the sintering operation, the heat causes the metal of the core 20 to become molten. When this occurs, the core metal infiltrates into the pores of the gear metal 31, making its way outward, laterally and inward by capillary attraction, leaving a void forming the lubricant reservoir 15 previously described. When sintering has proceeded for the time desired, the workpiece is removed from the sintering oven and cooled. It now has the appearance shown in Figures 1 and 2 and the sintered powdered metal has greatly increased strength as a result of the sintering operation. Furthermore, the infiltrated metal received from the core 20 increases the density of the gear and likewise enhances its strength and mechanical sliding or rolling action, depending upon the use to which it is put.

To fill the lubricant reservoir 15 with lubricant, such as oil, the sintered gear 10 may either be boiled in oil or be placed in a body of hot oil in a closed tank from which the air has been at least partially evacuated. With the evacuation of the tank, the chamber 15 also becomes evacuated to the same extent, with the air therein passing outward through the pores in the metal. These pores, it may be mentioned, are not clogged completely by the core metal as it infiltrates the pores, so that there remain minute capillary passageways for the air to depart and for the lubricant to enter and leave. When the air is again admitted to the tank, atmospheric pressure exerted on the surface of the oil forces the oil through the pores of the submerged gear 10 into the chamber or reservoir 15 and charges it with lubricant.

During the use of the gear 10, the oil in the lubricant chamber or reservoir 15 makes its way through the pores of the metal comprising the walls between the teeth 11 and the chamber or reservoir extension 17, depositing a thin film of the oil upon the gear teeth 11 and likewise upon the root surfaces 12. Consequently, when the gear rotates against another gear or rack, the rolling surfaces are constantly lubricated with this thin film of oil. As rapidly as the film is used up, other oil makes its way through the pores of the metal, replenishing the lubricant. Consequently, there is a constant flow of lubricant in minute quantities sufficient to lubricate the working surfaces of the gear 10 adequately but not excessively. In many gears, this lubricant in the chamber or reservoir 15 is sufficient to last the useful life of the gear.

The cam 40 shown in Figure 7 is made in the same manner as the gear 10, with a core of similar material having a configuration similar to the lubricant chamber or reservoir 41 therein. The cam 40 has a main body 42 of any suitable shape with one or more lobes 43 of the desired configuration. The cam 40 also has a bore 44 and a keyway 45 for a drive shaft and key respectively. The lubricant chamber or reservoir 41, on the other hand, has an annular portion 46 and a projecting portion 47 extending outward into the lobe 43.

The cam 40 is made in the same manner and charged with lubricant in the same way as that described above for the gear 10. In use, for example, in raising and lowering the head 48 of a cam follower 49, lubricant flows through the capillary passageways in the cam 40 from the reservoir 41 and deposits itself in a thin film upon the outer surface of the cam, lubricating the latter to reduce friction as it slides over the surface of the head 48 on the cam follower 49. In this way, also, the lubricant is provided in a sufficient quantity which is adequate without being excessive.

The sprocket wheel, generally designated 50, shown in Figures 8 and 9 is made in a similar manner to the gear wheel 10 of Figures 1 and 2 and hence requires no additional description other than to state that it consists of a body 51 having sprocket teeth 52 separated by root portions 53 and having a central bore 54 with a keyway 55. A lubricant reservoir or chamber 56 with an annular portion 57 and projecting portions 58 extending into the interiors of the teeth 52 supplies lubricant freely to the teeth 52 in the same manner as described previously in connection with Figures 1 and 2, and is charged with lubricant in the same way.

It will be obvious that, merely by changing the configuration of the mold cavity and core, a self-lubricating internal gear wheel or ratchet wheel may likewise be formed by the same principles described above. The pawl of the ratchet wheel, as it slides over the surfaces of the ratchet wheel teeth, will slide freely with reduced friction because of the thin layer of lubricant reaching the toothed surfaces through the capillary passageways in the teeth 52.

The modified toothed wheel, generally designated 60, shown in Figure 10 has a body 61 of sintered powdered metal, such as powdered iron, with sprocket teeth 62 separated from one another by root portions 63 and having a central bore 64 provided with a keyway 65. A cellular or honeycomb lubricant chamber, generally designated 66, is provided within the gear body 61 and, as before, consists of an annular portion 67 and projecting portions 68 extending into the interiors of the teeth 62.

The gear 60 with its honeycomb or cellular reservoir 66 is made by first preparing a composite core, generally designated 69 (Figure 11) using a mixture of particles 70 (shown dotted in Figures 11 and 12) of an infiltratable material as described above, mixed with particles 71 (shown lined or cross-hatched in Figures 11 and 12) of non-infiltratable material. If the gear body 61 is to be made from powdered iron, the core 69 may be made of a mixture of coarser powdered iron particles 71 and coarser copper-zinc alloy particles 70 than the particles composing the body 61. These coarse particles 70 and 71 of the two materials are thoroughly mixed together by being placed in a receptacle and violently agitated or shaken so as to disperse the particles fairly evenly throughout the mixture. The mixture is then placed in a mold of suitable configuration in a conventional molding press and pressed into the desired shape, such as that shown in Figure 11, consisting of an annular portion 72 with radially projecting teeth 73.

The composite core 69 of intermingled infiltratable and non-infiltratable particles 70 and 71 is now placed in the mold or die cavity of a suitable molding press, such as that described above, upon a layer of the powdered material which is to form the gear body 61 or at the desired level, taking into account the compression of the charge during molding. The core 69 is then surrounded with the powdered material for the body 61 to the desired height or thickness within the die cavity, after which the plunger of the press is advanced into the die cavity to compress the charge to form the composite unsintered assembly, generally designated 74. The assembly 74 is then removed from the die cavity, placed in a suitable sintering oven, and sintered for a suitable time at a suitable temperature. For a small gear made of powdered iron, a sintering time of approximately one-half hour at 2020° F. has been found satisfactory. To prevent the formation of an undesirable granular structure in the body of the gear by the application of heat at too high a temperature or for too long a period of time, it is desirable to carefully regulate the time and temperature of sintering.

During the sintering operation, the infiltratable particles 70 melt, being of a lower melting point than the remaining materials such as the particles 71 and the material of the body 61, and infiltrate the pores of the body 61 by capillary attraction. The infiltration, however, does not completely clog the pores but leaves them sufficiently open to enable the flow of lubricant in the finished gear. The departure of the infiltratable particles 70, however, leaves minute voids 75 throughout the reservoir space 76, interspersed between the particles 71 forming the cellular or honeycomb structure now occupying the reservoir space 66. During sintering, of course, a part of the infiltratable material of the particles 70 infiltrates into the pores of the reservoir particles 71, in addition to the remaining portion which infiltrates the gear body 61.

The reservoir 66 is now filled with lubricant in the same manner described in connection with the previously described forms of the invention. The cellular or honeycomb reservoir 66 receives and holds a supply of lubricant without the formation of air bubbles or air pockets which sometimes arise in the plain or empty reservoir chambers of the foregoing forms of the invention. The cellular structure also strengthens the gear mechanically and thus enables it to withstand heavier duty operation than with the plain reservoir.

It is, of course, obvious that the cellular lubricant chamber construction described in connection with the gear 60 of Figures 10 to 12 inclusive may equally well be used in the cam of Figure 7, the sprocket wheel of Figure 8 or in other toothed or lobed wheels, such as ratchet wheels and the like. It will also be evident that the cam of Figure 7 may have an indentation or concave lobe whereupon the extension 47 will be an indentation, rather than a projection.

What I claim is:

1. An automatically self-lubricating toothed or lobed wheel comprising a rotatable hollow one-piece wheel body of porous sintered powdered metal having a periphery with at least one projection thereon extending outwardly therefrom, said projection being provided with a bearing surface frictionally engaging an opposing cooperating machine element surface, said surfaces moving relatively to one another during their engagement with one another, and an internal lubricant filled chamber enclosed substantially entirely within said body and disposed between the central part of said body and said periphery adjacent said bearing surface of said projection, said body having therein a myriad of tiny capillary lubricant passageways leading from said chamber to said periphery and to said bearing surface of said projection, said projection containing a densifying metal having a lower melting point than that of said body only partially filling the pores thereof whereby to increase the life and decrease the wear of said bearing surface by strengthening said bearing surface while still providing lubricant flow through said pores to said bearing surface.

2. An automatically self-lubricating toothed or lobed wheel comprising a rotatable hollow one-piece wheel body of porous sintered powdered metal having a periphery with at least one projection thereon extending outwardly therefrom, said projection being provided with a bearing surface frictionally engaging an opposing cooperating machine element surface, said surfaces moving relatively to one another during their engagement with one another, and an internal lubricant filled chamber enclosed substantially entirely within said body and disposed between the central part of said body and said periphery adjacent said bearing surface of said projection, said body having therein a myriad of tiny capillary lubricant passagways leading from said chamber to said periphery and to said bearing surface of said projection, said projection containing a densifying metal having a lower melting point than that of said body only partially filling the pores thereof whereby to increase the life and decrease the wear of said bearing surface by strengthening said bearing surface while still providing lubricant flow through said pores to said bearing surface, said chamber having an extension thereof lying within said projection.

3. An automatically self-lubricating cogwheel comprising a rotatable hollow one-piece wheel body of porous sintered powdered metal having a periphery with a plurality of circumferentially spaced teeth thereon separated by root surfaces and extending outwardly therefrom, said teeth being provided with bearing surfaces having rolling and sliding frictional engagement with opposing cooperating machine element surfaces meshing with said teeth, said teeth surfaces and said machine element surfaces moving relatively to one another during their engagement with one another, and an internal lubricant filled chamber enclosed substantially entirely within said body and disposed between said shaft opening and said periphery adjacent said root surfaces, said body having therein a myriad of tiny capillary lubricant passageways leading from said chamber to said periphery and to said bearing surfaces of said teeth, said teeth containing a densifying metal having a lower melting point than that of said body only partially filling the pores thereof whereby to increase the life and decrease the wear of said bearing surfaces by strengthening said bearing surfaces while still providing lubricant flow through said pores to said bearing surfaces.

4. An automatically self-lubricating cogwheel comprising a rotatable hollow one-piece wheel body of porous sintered powdered metal having a periphery with a plurality of circumferentially spaced teeth thereon separated by root surfaces and extending outwardly therefrom, said teeth being provided with bearing surfaces having rolling and sliding frictional engagement with opposing cooperating machine element surfaces meshing with said teeth, said teeth surfaces and said machine element surfaces moving relatively to one another during their engagement with one another, and an internal lubricant filled chamber enclosed substantially entirely within said body and disposed between said shaft opening and said periphery adjacent said root surfaces, said body having therein a myriad of tiny capillary lubricant passageways leading from said chamber to said periphery and to said bearing surfaces of said teeth, said teeth containing a densifying metal having a lower melting point than that of said body only partially filling the pores thereof whereby to increase the life and decrease the wear of said bearing surfaces by strengthening said bearing surfaces while still providing lubricant flow through said pores to said bearing surfaces, said chamber having circumferentially spaced extensions thereof lying within said teeth.

5. An automatically self-lubricating cam comprising a rotatable hollow one-piece cam body of porous sintered powdered metal having a periphery with at least one lobe thereon and extending outwardly therefrom, said lobe being provided with a bearing surface slidingly and frictionally engaging an opposing cooperating machine element surface, said surfaces moving relatively to one another during their engagement with one another, and an internal lubricant filled chamber enclosed substantially entirely within said body and disposed between the central part of said body and said periphery adjacent said bearing surface of said lobe, said body having therein a myriad of tiny capillary lubricant passageways leading from said chamber to said periphery and to said bearing surface of said lobe, said lobe containing a densifying metal having a lower melting point than that of said body only partially filling the pores thereof whereby to increase the life and decrease the wear of said bearing surface by strengthening said bearing surface while still providing lubricant flow through said pores to said bearing surface.

6. An automatically self-lubricating cam comprising a rotatable hollow one-piece cam body of porous sintered powdered metal having a periphery with at least one lobe thereon and extending outwardly therefrom, said lobe being provided with a bearing surface slidingly and frictionally engaging an opposing cooperating machine element surface, said surfaces moving relatively to one another during their engagement with one another, and an internal lubricant filled chamber enclosed substantially entirely within said body and disposed between the central part of said body and said periphery adjacent said bearing surface of said lobe, said body having therein a myriad of tiny capillary lubricant passageways leading from said chamber to said periphery and to said bearing surface of said lobe, said lobe containing a densifying metal having a lower melting point than that of said body only partially filling the pores thereof whereby to increase the life and decrease the wear of said bearing surface by strengthening said bearing surface while still providing lubricant flow through said pores to said bearing surface, said chamber having an extension lying within said lobe.

7. An automatically self-lubricating toothed or lobed wheel comprising a rotatable hollow one-piece wheel body of porous sintered powdered metal having a periphery with at least one projection thereon and extending outwardly therefrom, said projection being provided with a bearing surface frictionally engaging an opposing cooperating machine element surface, said surfaces moving relatively to one another during their engagement with one another, an internal lubricant filled chamber enclosed substantially entirely within said body and disposed between the central part of said body and said periphery adjacent said bearing surface of said projection, said body having therein a myriad of tiny capillary lubricant passageways leading from said chamber to said periphery and to said bearing surface of said projection, said projection containing a densifying metal having a lower melting point than that of said body only partially filling the pores thereof whereby to increase the life and decrease the wear of said bearing surface by strengthening said bearing surface while still providing lubricant flow through said pores to said bearing surface, and a porous cellular structure of coarser porosity than said wheel body disposed in said lubricant chamber.

8. An automatically self-lubricating toothed or lobed wheel comprising a rotatable hollow one-piece wheel body of porous sintered powdered metal having a periphery with at least one projection thereon and extending outwardly therefrom, said projection being provided with a bearing surface frictionally engaging an opposing cooperating machine element surface, said surfaces moving relatively to one another during their engagement with one another, an internal lubricant filled chamber enclosed substantially entirely within said body and disposed between the central part of said body and said periphery adjacent said bearing surface of said projection, said chamber having an extension thereof lying within said projection, said body having therein a myriad of tiny capillary lubricant passageways leading from said chamber to said periphery and to said bearing surface of said projection, said projection containing a densifying metal having a lower melting point than that of said body only partially filling the pores thereof whereby to increase the life and decrease the wear of said bearing surface by strengthening said bearing surface while still providing lubricant flow through said pores to said bearing surface, and a porous cellular structure of coarser porosity than said wheel body disposed in said lubricant chamber and having a cellular portion disposed in said chamber extension.

9. An automatically self-lubricating cogwheel comprising a rotatable hollow one-piece wheel body of porous sintered powdered metal having a periphery with a plurality of circumferentially spaced teeth thereon and extending outwardly therefrom separated by root surfaces, said teeth being provided with bearing surfaces having rolling and sliding frictional engagement with opposing cooperating machine element surfaces meshing with said teeth, said teeth surfaces and said machine element surfaces moving relatively to one another during their engagement with one another, an internal lubricant filled chamber enclosed substantially entirely within said body and disposed between the central part of said body and said periphery adjacent said root surfaces, said body having therein a myriad of tiny capillary lubricant passageways leading from said chamber to said periphery and to said bearing surfaces of said teeth, said teeth containing a densifying metal having a lower melting point than that of said body only partially filling the pores thereof whereby to increase the life and decrease the wear of said bearing surfaces by strengthening said bearing surfaces while still providing lubricant flow through said pores to said bearing surfaces, and a porous cellular structure of coarser porosity than said wheel body disposed in said lubricant chamber.

10. An automatically self-lubricating cogwheel comprising a rotatable hollow one-piece wheel body of porous sintered powdered metal having a periphery with a plurality of circumferentially spaced teeth thereon and extending outwardly therefrom separated by root surfaces, said teeth being provided with bearing surfaces having rolling and sliding frictional engagement with opposing cooperating machine element surfaces meshing with said teeth, said teeth surfaces and said machine element surfaces moving relatively to one another during their engagement with one another, an internal lubricant filled chamber enclosed substantially entirely within said body and disposed between the central part of said body and said periphery adjacent said root surfaces, said body having therein a myriad of tiny capillary lubricant passageways leading from said chamber to said periphery and to said bearing surfaces of said teeth, said teeth containing a densifying metal having a lower melting point than that of said body only partially filling the pores thereof whereby to increase the life and decrease the wear of said bearing surfaces by strengthening said bearing surfaces while still providing lubricant flow through said pores to said bearing surfaces, said chamber having circumferentially spaced extensions thereof lying within said teeth, and a porous cellular structure of coarser porosity than said wheel body disposed in said lubricant chamber and having cellular portions disposed in said circumferentially spaced chamber extensions.

11. An automatically self-lubricating cam comprising a rotatable hollow one-piece cam body of porous sintered powdered metal having a periphery with at least one lobe thereon and extending outwardly therefrom, said lobe being provided with a bearing surface slidingly and frictionally engaging an opposing cooperating machine element surface, said surfaces moving relatively to one another during their engagement with one another, an internal lubricant filled chamber enclosed substantially entirely within said body and disposed between the central part of said body and said periphery adjacent said bearing surface of said lobe, said body having therein a myriad of tiny capillary lubricant passageways leading from said chamber to said periphery and to said bearing surface of said lobe, said lobe containing a densifying metal having a lower melting point than that of said body only partially filling the pores thereof whereby to increase the life and decrease the wear of said bearing surface by strengthening said bearing surface while still providing lubricant flow through said pores to said bearing surface, and a porous cellular structure of coarser porosity than said wheel body disposed in said lubricant chamber.

12. An automatically self-lubricating cam comprising a rotatable hollow one-piece cam body of porous sintered powdered metal having a periphery with at least one lobe thereon and extending outwardly therefrom, said lobe being provided with a bearing surface slidingly and frictionally engaging an opposing cooperating machine element surface, said surfaces moving relatively to one another during their engagement with one another, an internal lubricant filled chamber enclosed substantially entirely within said body and disposed between the central part of said body and said periphery adjacent said bearing surface of said lobe, said chamber having an extension lying within said lobe, said body having therein a myriad of tiny capillary lubricant passageways leading from said chamber to said periphery and to said bearing surface of said lobe, said lobe containing a densifying metal having a lower melting point than that of said body only partially filling the pores thereof whereby to increase the life and decrease the wear of said bearing surface by strengthening said bearing surface while still providing lubricant flow through said pores to said bearing surface, and a porous cellular structure of coarser porosity than said wheel body disposed in said lubricant chamber and having a cellular portion disposed in said chamber extension.

References Cited in the file of this patent

UNITED STATES PATENTS

| | | |
|---|---|---|
| Re. 22,118 | Lohrey | June 16, 1942 |
| 1,028,176 | Ambler | June 4, 1912 |
| 1,186,434 | Pierce | June 6, 1916 |
| 2,275,420 | Clark et al. | Mar. 10, 1942 |
| 2,300,048 | Koehring | Oct. 27, 1942 |
| 2,331,909 | Hensel et al. | Oct. 19, 1943 |

FOREIGN PATENTS

| | | |
|---|---|---|
| 162,728 | Great Britain | May 2, 1921 |
| 276,275 | Italy | July 17, 1930 |